(12) United States Patent
Erden et al.

(10) Patent No.: US 10,255,945 B1
(45) Date of Patent: Apr. 9, 2019

(54) MEDIA STORAGE AREAL DENSITY

(71) Applicant: Seagate Technology LLC, Cupertino, CA (US)

(72) Inventors: Mehmet Fatih Erden, St. Louis Park, MN (US); Steven Douglas Granz, Shakopee, MN (US); Peter S. Harllee, Boulder, CO (US); Stephanie Hernandez, Shakopee, MN (US); Walter R. Eppler, Cranberry Township, PA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/945,555

(22) Filed: Apr. 4, 2018

(51) Int. Cl.
*G11B 20/12* (2006.01)

(52) U.S. Cl.
CPC .. *G11B 20/1217* (2013.01); *G11B 2020/1238* (2013.01); *G11B 2020/1298* (2013.01)

(58) Field of Classification Search
CPC ..... G11B 5/00; G11B 20/10009; G11B 27/36; G11B 20/10268; G11B 5/09; G11B 20/16; G11B 20/12
USPC ...................... 360/48, 29, 40, 24, 25, 31, 49
See application file for complete search history.

(56) References Cited

U.S. PATENT DOCUMENTS

| | | | |
|---|---|---|---|
| 7,027,247 B2 * | 4/2006 | Heydari | G11B 5/59633 360/31 |
| 9,373,349 B1 | 6/2016 | Erden et al. | |
| 9,818,445 B2 | 11/2017 | Zhu et al. | |
| 2014/0281793 A1 | 9/2014 | Patapoutian | |

\* cited by examiner

*Primary Examiner* — Nabil Z Hindi
(74) *Attorney, Agent, or Firm* — Holzer Patel Drennan

(57) ABSTRACT

In one implementation, the disclosure provides a method comprising detecting one or more areas of a storage medium having a data pattern with a plurality of consecutive bits, where the consecutive bits have the same polarity. The method further comprises encoding additional information on a section of the one or more detected areas, where the section of the one or more detected areas has a signal to noise ratio (SNR) higher than SNR of the other areas of the storage media.

20 Claims, 5 Drawing Sheets

US 10,255,945 B1

MEDIA STORAGE AREAL DENSITY

BACKGROUND

In a conventional Hard-Disk Drive (HDD) storage system, the drive receives a file to be stored, divides the file into small pieces, called sectors, encodes each sector, and writes the sector with a write head onto a storage medium. When a user wants to read the file, a read head reads the sector from the storage medium, sends it through detector and decoder blocks to obtain the sectors, forms the file, and communicates the file to the user.

The encoded sector written on the storage medium has various types of patterns, some are easy to detect and decode, and some are not. The patterns that are not easy to detect and decode define a sector failure rate (SFR) for a given application. On the other hand, the patterns that are easy to detect and decode generally do not affect the SFR while covering space on the surface of the medium.

SUMMARY

In one implementation, the disclosure provides a method comprising detecting one or more areas of a storage medium having a data pattern with a plurality of consecutive bits, where the consecutive bits have the same polarity. The method further comprises encoding additional information on a section of the one or more detected areas, where the section of the one or more detected areas has a signal to noise ratio (SNR) higher than SNR of the other areas of the storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
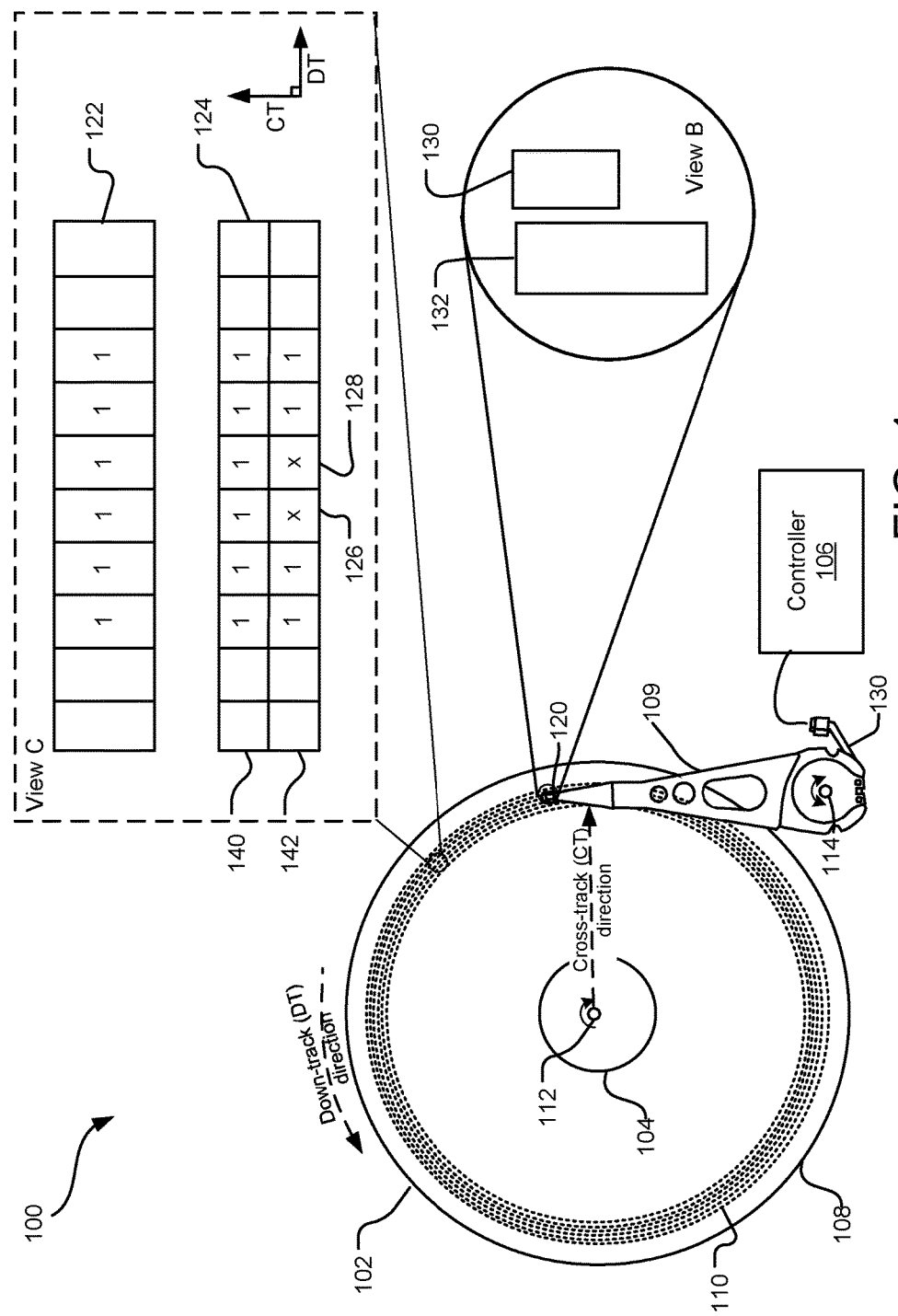
FIG. 1 illustrates an example data storage device, using two-dimensional magnetic recording (TDMR) to encode additional data on data storage medium.

FIG. 1 illustrates an example data storage device 100, using two-dimensional magnetic recording (TDMR) to encode additional data on magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (e.g., a read element 132). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks 110 on the magnetic storage medium 108.

A transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 114. The seek operation positions the transducer head assembly 120 over a target data track for read and write operations.

Referring to View B, the transducer head assembly 120 includes, among other features, a write pole 130 and a read element 132. The write pole 130 magnetizes bits in the concentric data tracks 110 to record data to the magnetic storage medium 108. In conventional recording, the write pole 130 magnetizes bits across the full width of the concentric data tracks 110. In dual data track recording, the write pole 130 records two sub-tracks for each concentric data track 110. In some implementations, the write pole 130 records the second sub-track on a second rotation. In other implementations, an additional write pole may be added (not shown) to the transducer head assembly 120 to record the first and second sub-tracks simultaneously. The read element 132 reads the magnetized data bits to read data from the magnetic storage medium 108.

In dual data track recording, the write pole 130 is narrower than the read element 132. Typically, the write pole 130 is approximately half the width of the read element 132. Accordingly, the read element 132 may not be able to read two distinct tracks written by the write pole 130. However, dual data track recording can be used to encode additional data in concentric data tracks 110. By encoding additional data on the second sub-track in areas with a high signal to noise ratio (SNR), additional bits can be encoded and read by the read element 132. Generally, a high SNR area corresponds to an area having bit error rate (BER) of less than 0.001. A low SNR area generally corresponds to an area having a BER of greater than 0.01.

View C shows a conventionally recorded data track 122 with 10 bits across the data track 122 and a dual data track 124 with 10 data bits across each of two sub-tracks 140 and 142. In the illustrated implementation, the dual data track 124 includes additional data through recording extra marks at a bit 126 and a bit 128 on the sub-track 142. In the conventionally recorded data track 122, the write pole and the read element are the same width. In conventionally recorded data track 122, the write pole may write either a 1 or a −1 at each bit in the conventionally recorded data track 122, limiting the read element to reading a 1 or a −1. In the dual data track 124, the write pole 130 is smaller than the read element 132. The write pole 130 still may only write a 1 or a −1 at each bit. The data track 122 is shown to have a data pattern (or mark) of 1, 1, 1, 1, 1, 1 written thereon. However, by utilizing dual tracks, the reader can read either a −1, 1, or 0. The same magnetization as the conventionally recorded data track 122 can be obtained by writing two narrow tracks where 1s are written at bit 126 and bit 128. If, on the second pass, the second narrow track writes −1s at bit 126 and bit 128, the read element will read 1, 1, 0, 0, 1, 1. Accordingly, an additional bit may be encoded in the dual track implementation.

For the read element 132 to accurately read the additional bit encoded in the sub-track 142, it is desirable to include the additional bit at an area of a mark with a high SNR. For the purposes of this disclosure, a mark is a run of consecutive bits. For example, the mark shown in the dual data track 124 is a mark of 6 consecutive bits. For example, in the dual data track 124, a mark of length 6 is used, and the additional bit is encoded in the center of the mark, where the SNR is highest. These marks are chosen because they are easy to detect and decode. Placing the additional bits in areas with a high SNR allows the read element 132 to accurately read the additional bits while causing minimal impact on the sector failure rate (SFR) of the system as a whole. Additional bits may be written on longer marks. Generally, more additional data can be written on longer marks because there are more high SNR bits towards the center of a longer mark.

Figure 2:
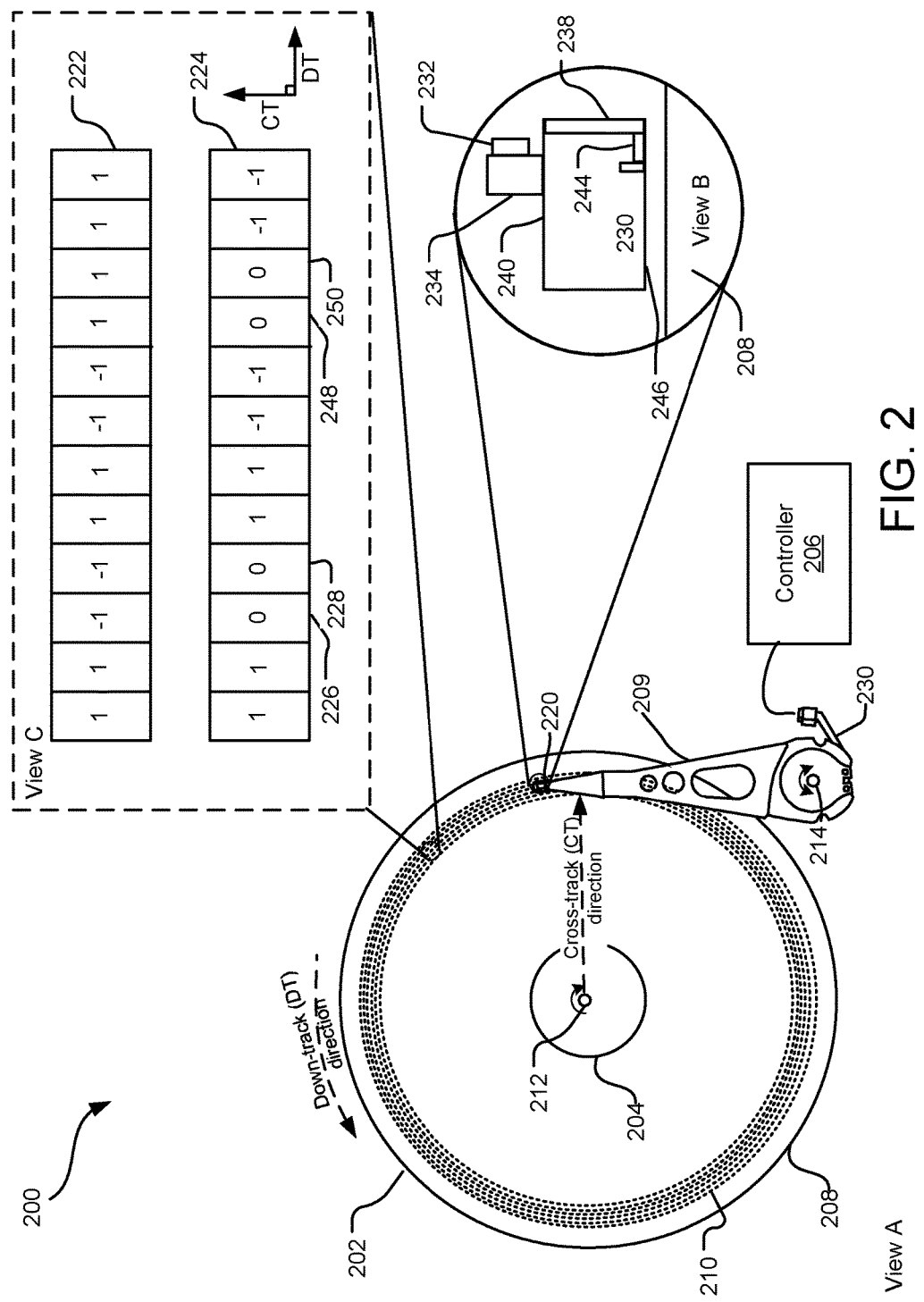
FIG. 2 illustrates an example data storage device, using heat assisted magnetic recording (HAMR) to encode additional data on data storage medium.

FIG. 2 illustrates an example data storage device system 200, using heat assisted magnetic recording (HAMR) to encode additional data on a magnetic storage medium 208. Although other implementations are contemplated, the magnetic storage medium 208 is, in FIG. 2, a magnetic storage disc on which data bits can be recorded using a magnetic write pole (e.g., a write pole 230) utilizing assisted writing using a heat source (e.g., a laser) and from which data bits can be read using a magnetoresistive element (not shown). As illustrated in View A, the magnetic storage medium 208 rotates about a spindle center or a disc axis of rotation 212 during rotation, and includes an inner diameter 204 and an outer diameter 202 between which are a number of concentric data tracks 210. Information may be written to and read from data bit locations in the data tracks 210 on the magnetic storage medium 208.

A transducer head assembly 220 is mounted on an actuator assembly 209 at an end distal to an actuator axis of rotation 214. The actuator assembly 209 rotates during a seek operation about the actuator axis of rotation 212. The seek operation positions the transducer head assembly 220 over a target data track for read and write operations.

During recording employing heat-assisted magnetic recording (HAMR) (e.g., View B), magnetic grains on the magnetic storage medium 208 are temporarily heated during the recording process to selectively lower magnetic coercivity in a tightly focused area of the magnetic storage medium 208 that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

Referring to View B, the transducer head assembly 220 includes, among other features, a heat source 232 (e.g., a laser) coupled to a submount assembly 234. Light from the heat source 232 is directed to a waveguide 238 mounted to a slider 240. Light exiting the waveguide 138 is focused, via a Near Field Transducer (NFT) 244, and applied to a bit location on the magnetic storage medium 208 just before the bit location is subjected to a magnetic pulse generated by the write pole 230. As an air-bearing surface 246 of the slider 240 "flies" across the surface of the storage medium 208, the write pole 230 selectively magnetizes the underlying magnetic grains of the magnetic storage medium 208.

View C shows a data track 222 with 10 bits across the data track 222 recording using conventional HAMR recording and a data track 224 including additional data through recording a 0 at a bit 226, at a bit 228, at a bit 248, and at a bit 250. In the data track 222 recorded using conventional HAMR recording, the heat source 232 remains active during the entirety of the recording operation, so each bit is magnetized as the write pole 230 moves over the magnetic storage medium 208, resulting in the recording of either a 1 or a −1 at each bit location. By utilizing a method of HAMR recording where the heat source 232 is kept on and magnetization is turned off at certain bit locations (e.g., at bits 226, 228, 248, and 250), the write pole 230 can also write 0 at each bit. Accordingly, an additional bit may be encoded in the data track 224.

For a read element to accurately read the additional bit encoded in the data track 224, it is desirable to include the additional bit at an area of a mark with a high SNR. The high SNR area generally corresponds to an area having a BER of less than 0.001. For example, in the data track 224, two marks of length 6 are used and the additional bits are encoded in the center of the mark, where the SNR is highest. These marks are chosen because they are easy to detect and decode. Placing the additional bits in areas with a high SNR allows the read element to accurately read the additional bits while causing minimal impact on the sector failure rate (SFR) of the system as a whole. Additional bits may be written on longer marks. Generally, more additional data can be written on longer marks because there are more high SNR bits towards the center of a longer mark.

Figure 3:
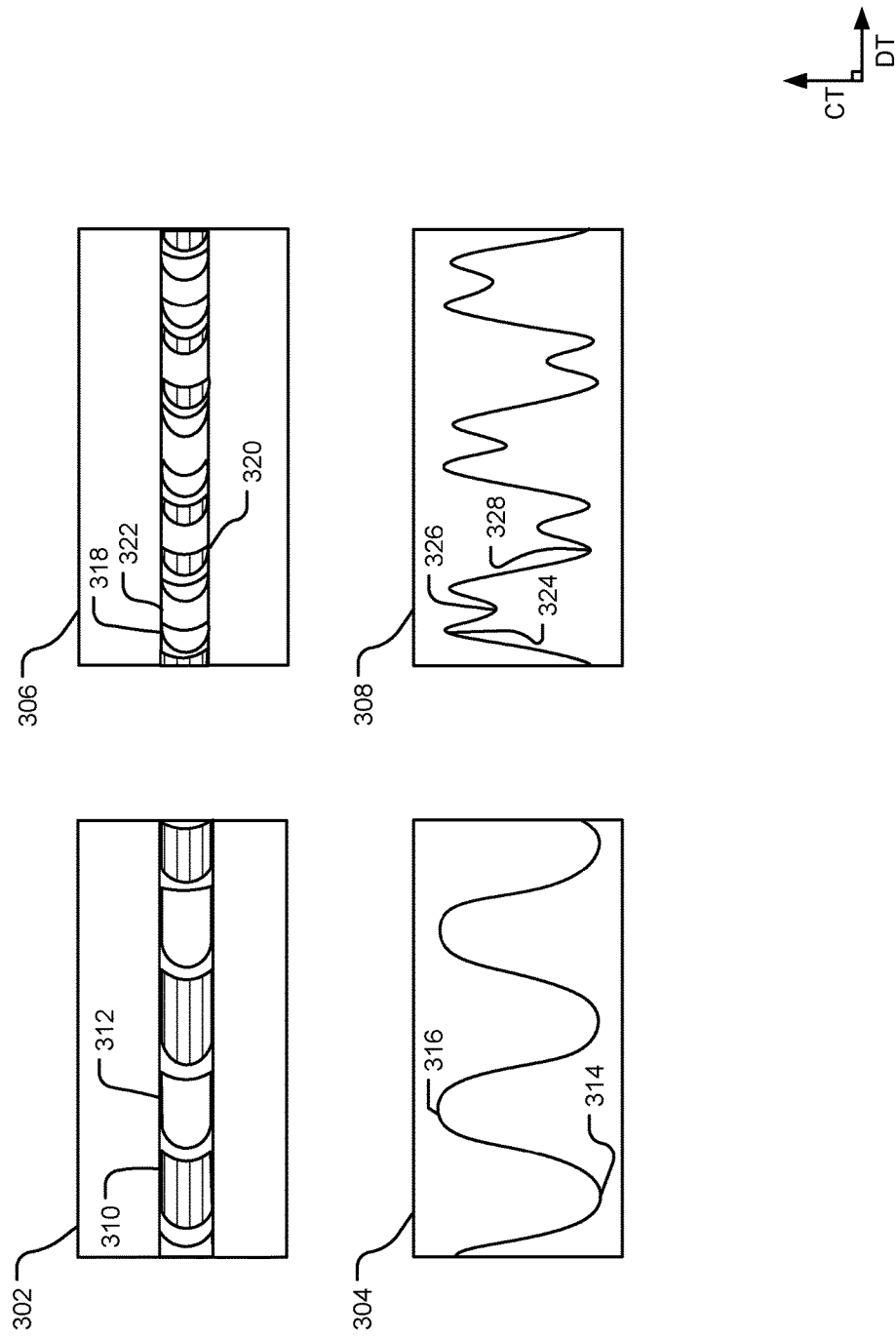
FIG. 3 illustrates example additional bits encoded on data storage using HAMR.

FIG. 3 illustrates additional bits encoded on a data storage medium using HAMR. A data track 302 shows the micromagnetic patterns of bits recorded on a storage media using HAMR. A reader graph 304 shows the read-back signals as seen by the reader when reading the data track 302. In conventional HAMR recording, as shown in data track 302, two marks may be recorded. Marks may be recorded that correlate to a magnetic polarity of −1 (e.g., mark 310) or 1 (e.g., mark 312). The reader graph 304 shows that when the reader is over a mark corresponding to a magnetic polarity of −1, such as the mark 310, the read-back signal corresponds to a magnetic polarity of −1, such as at a point 314 corresponding to the mark 310. Similarly, when the reader is over a mark corresponding to a magnetic polarity of 1, such as the mark 312, the read-back signal corresponds to a magnetic polarity of 1, such as at a point 316 corresponding to the mark 312. In the reader graph 304, the reader passes through area corresponding to a magnetic polarity of 0 briefly in the space between marks.

A data track 306 shows the micromagnetic patterns of bits recorded on a storage media using a modified method of HAMR to encode additional information on the data track 306. A reader graph 308 shows the read-back signals as seen by the reader when reading the data track 306. Like in data track 302, two types of marks may be recorded. Marks may be recorded that correlate to a magnetic polarity of 1 (e.g., mark 318) or −1 (e.g., mark 320). Unlike the conventional HAMR method used in data track 302, during the modified method of HAMR, additional information may be encoded by briefly turning off the write head during writing to create larger spaces in between marks (e.g., space 322) that correspond to a magnetic polarity of 0.

The graph 308 shows that, like in the conventional HAMR method, when the reader is over a mark corresponding to a magnetic polarity of 1, such as the mark 318, the read-back signal corresponds to a magnetic polarity of 1, such as at a point 324 corresponding to the mark 318. When the reader is over a mark corresponding to a magnetic polarity of −1, such as the mark 320, the read-back signal corresponds to a magnetic polarity of −1, such as at a point 328 corresponding to the mark 320. Instead of briefly passing through areas corresponding to a magnetic polarity of 0, when the reader is over a space, such as the space 322, the read-back signal corresponds to a magnetic polarity of 0, such as at a point 326 corresponding to the space 322. Effectively, the reader can read signals corresponding to a magnetic polarity of 1, −1, or 0 with the modified HAMR method, as opposed to reading only signals corresponding to a magnetic polarity of 1 or −1 with the conventional HAMR method. The ability to read at a magnetic polarity of 0 means that additional information can be included in data tracks recorded using the modified HAMR method, such as data track 306.

Figure 4:
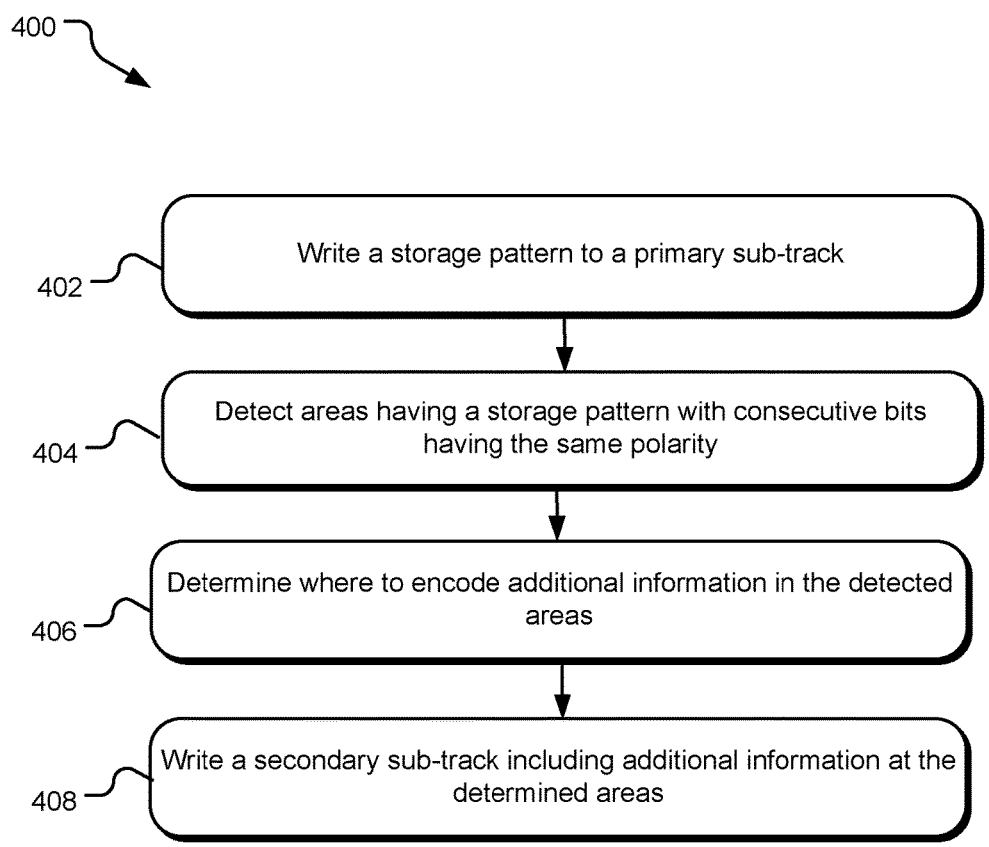
FIG. 4 illustrates example operations for using TDMR to encode additional data on a data storage medium.

FIG. 4 illustrates example operations 400 for using TDMR to encode additional data on a data storage medium. The data storage medium is a magnetic storage medium, for example, in one implementation, the data storage medium is a magnetic storage disc on which data bits can be recorded using a magnetic write pole. When TMDR is used to encode additional data on the data storage medium, data tracks on the data storage medium are partitioned into at least a primary sub-track and a secondary sub-track. The write pole may write data to the sub-tracks separately, while a reader reads both sub-tracks simultaneously.

A writing operation 402 writes a storage pattern to a primary sub-track. The storage pattern is written to the primary sub-track by a write pole using conventional methods of magnetic recording, by magnetizing bits in the primary sub-track to record data on the bits.

A detecting operation 404 detects areas having a storage pattern with consecutive bits having the same polarity. Long marks of consecutive bits having the same polarity have a higher SNR in the middle of the mark. The area having a higher SNR generally corresponds to a BER of less than 0.001. Therefore, extra bits can be written on the secondary sub-track near the middle of the mark without reducing the SNR to an unacceptable level. Generally, a suitable long mark will have a minimum of two consecutive bits at the beginning of the mark, a minimum of two consecutive bits to write the extra bit, and a minimum of two consecutive bits to end the mark. Accordingly, marks with six or more consecutive bits of the same polarity will be detected as possible locations to write additional data.

A determining operation 406 determines where to encode additional information in the detected areas. For example, if the operation 404 determines that a mark with six consecutive bits of the same polarity is detected, bits 3 and 4 of the secondary sub-track may be used to write additional data. Similarly, if the operation 404 determines that a mark with seven consecutive bits of the same polarity is detected, bits 3, 4 and 5 of the secondary sub-track may be used to write additional data. In this case, the extra bit can be written using bits 3 and 4, 4 and 5, or 3, 4, and 5. Assuming the primary sub-track has 7 consecutive 1's, then there are 4 possibilities for the second sub-track, which are (1 1 −1 −1 1 1 1), (1 1 1 −1 −1 1 1), (1 1 −1 −1 −1 1 1), (1 1 1 1 1 1 1). In general, for a given mark consisting of L consecutive bits of same polarity, there are $[(L-4)*(L-5)/2+1]$ possibilities. If L is 6, then this corresponds to potentially increasing system capacity by 6.46%. The potential capacity increase changes as a function of L. For example, with L equal to 5, it becomes 11.07% while it drops to 1% when L is 9.

A second writing operation 408 writes a secondary sub-track including additional information at the determined areas. The secondary sub-track may be written by the same write element that wrote the primary track, or may be written by a separate write element. The write element may, in one implementation, write either a 1 or a −1 to each bit in the secondary sub-track. A read element reads the primary track and the secondary sub-track simultaneously. Accordingly, the read element may read a −1, 1, or 0 from the combination of the primary track and the secondary sub-track.

Figure 5:
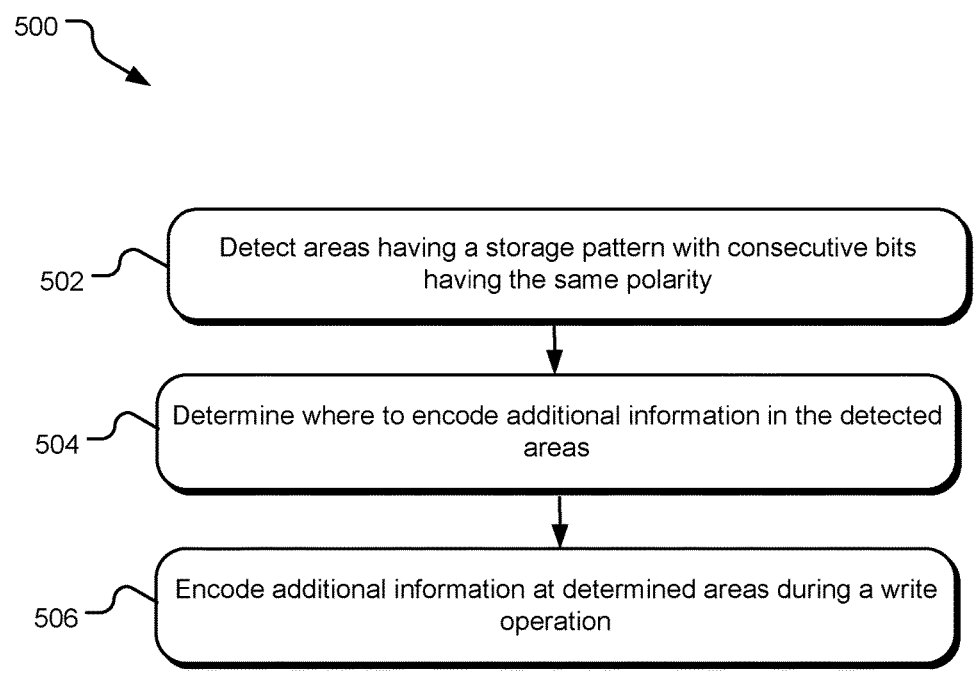
FIG. 5 illustrates example operations for using HAMR to encode additional data on a data storage medium.

FIG. 5 illustrates example operations 500 for using HAMR to encode additional data on a data storage medium. The data storage medium is a magnetic storage medium, for example, in one implementation, the magnetic storage medium is a magnetic storage disc on which data bits can be recorded using a magnetic write pole. During recording using HAMR, magnetic grains on the data storage medium are temporarily heated during the recording process to selectively lower magnetic coercivity in a tightly focused area of the data storage medium that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit.

A detecting operation 502 detects areas having a storage pattern with consecutive bits having the same polarity. Long marks of consecutive bits having the same polarity have a higher SNR in the middle of the mark. Therefore, extra bits can be written near the middle of the mark without reducing the SNR to an unacceptable level. Generally, a suitable long mark will have a minimum of two consecutive bits to write the extra bit, and a minimum of two consecutive bits to end the mark. Accordingly, marks with six or more consecutive bits of the same polarity will be detected as possible locations to write additional data.

A determining operation 504 determines where to encode additional information in the detected areas. For example, if the operation 504 determines that a mark with six consecutive bits of the same polarity is detected, bits 3 and 4 of the secondary sub-track may be used to write additional data. Similarly, if the operation 504 determines that a mark with seven consecutive bits of the same polarity is detected, bits 3, 4 and 5 of the secondary sub-track may be used to write additional data. In this case, the extra bit can be written using bits 3 and 4, 4 and 5, or 3, 4, and 5. Assuming the primary sub-track has 7 consecutive 1's, then there are 4 possibilities for the second sub-track, which are (1 1 −1 −1 1 1 1), (1 1 1 −1 −1 1 1), (1 1 −1 −1 −1 1 1), (1 1 1 1 1 1 1). In general, for a given mark consisting of L consecutive bits of same polarity, there are $[(L-4)*(L-5)/2+1]$ possibilities. If L is 6, then this corresponds to potentially increasing system capacity by 6.46%. The potential capacity increase changes as a function of L. For example, with L equal to 5, it becomes 11.07% while it drops to 1% when L is 9.

An encoding operation 506 encodes additional information at the determined areas during a write operation. The additional information is encoded by briefly turning off the write head while writing data to create larger spaces in between marks that correspond to a magnetic polarity of 0. Instead of briefly passing through areas corresponding to a magnetic polarity of 0, when the reader is over a space, the read-back signal corresponds to a magnetic polarity of 0. Effectively, the reader can read signals corresponding to a magnetic polarity of 1, −1, or 0 with the modified HAMR method, as opposed to reading only signals corresponding to a magnetic polarity of 1 or −1 with the conventional HAMR method. The ability to read at a magnetic polarity of 0 means that additional information can be included in data tracks recorded using the modified HAMR method.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   detecting one or more areas of a storage medium having a data pattern with a plurality of consecutive bits, the consecutive bits having the same polarity; and
   encoding additional information on a section of the one or more detected areas, the section of the one or more detected areas having a signal to noise ratio (SNR) higher than SNR of other areas of the storage medium.

2. The method of claim 1, wherein the additional information is encoded by turning off a magnetic field supplied by a magnetic writer when, during a writing process, the magnetic writer is over a portion of the detected area where the additional information is to be encoded.

3. The method of claim 2, wherein the additional information is read by a reader as an area with no magnetization.

4. The method of claim 1, wherein one or more tracks of the storage media are divided into a primary sub-track and a secondary sub-track.

5. The method of claim 4, wherein the data pattern is encoded on the primary sub-track by a first write head during a writing operation.

6. The method of claim 5, wherein the additional information is encoded on the secondary sub-track by a second write head during the writing operation.

7. The method of claim 6, wherein the additional information encoded on the secondary sub-track is read in conjunction with the data pattern encoded on the primary sub-track.

8. A system comprising:
   a storage media system including a media storage device; and
   a storage controller configured to:
   detect one or more areas of a storage medium having a data pattern with a plurality of consecutive bits, the consecutive bits having the same polarity, and
   encode additional information on a section of the one or more detected areas, the section of the one or more detected areas having a signal to noise ratio (SNR) higher than SNR of other areas of the storage media.

9. The system of claim 8, wherein the additional information is encoded by turning off a magnetic field supplied by a magnetic writer when, during a writing process, the magnetic writer is over a portion of the detected area where the additional information is to be encoded.

10. The system of claim 9, wherein the additional information is read by a reader as an area with no magnetization.

11. The system of claim 8, wherein the data pattern is encoded on a primary sub-track by a first write head during a writing operation.

12. The system of claim 11, wherein the additional information is encoded on a secondary sub-track by a second write head during the writing operation.

13. The system of claim 12, wherein the additional information encoded on the secondary sub-track is read in conjunction with the data pattern encoded on the primary sub-track.

14. One or more non-transitory computer-readable storage media encoding computer-executable instructions for executing on a computer system a computer process comprising:
   detecting one or more areas of a storage medium having a data pattern with a plurality of consecutive bits, the consecutive bits having the same polarity; and
   encoding additional information on a section of the one or more detected areas, the section of the one or more detected areas having a signal to noise ratio (SNR) higher than SNR of other areas of the storage medium.

15. The one or more non-transitory computer-readable storage media encoding computer-executable instructions for executing on the computer system the computer process of claim 14, wherein the additional information is encoded by turning off a magnetic field supplied by a magnetic writer when, during the writing process, the magnetic writer is over a portion of the detected area where the additional information is to be encoded.

16. The one or more non-transitory computer-readable storage media encoding computer-executable instructions for executing on the computer system the computer process of claim 15, wherein the additional information is read by a reader as an area with no magnetization.

17. The one or more non-transitory computer-readable storage media encoding computer-executable instructions for executing on the computer system the computer process of claim 14, wherein one or more tracks of the storage media are divided into a primary sub-track and a secondary sub-track.

18. The one or more non-transitory computer-readable storage media encoding computer-executable instructions for executing on the computer system the computer process of claim 17, wherein the data pattern is encoded on the primary sub-track by a first write head during a writing operation.

19. The one or more non-transitory computer-readable storage media encoding computer-executable instructions for executing on the computer system the computer process of claim 18, wherein the additional information is encoded on the secondary sub-track by a second write head during the writing operation.

20. The one or more non-transitory computer-readable storage media encoding computer-executable instructions for executing on the computer system the computer process of claim 19, wherein the additional information encoded on the secondary sub-track is read in conjunction with the data pattern encoded on the primary sub-track.

* * * * *